United States Patent
Glehn

[15] 3,700,266
[45] Oct. 24, 1972

[54] DEVICES FOR CONNECTING PIPES TOGETHER

[72] Inventor: Karl Glehn, Wiethasetstrasse 58, Cologne, Germany

[22] Filed: Dec. 28, 1970

[21] Appl. No.: 101,920

[30] Foreign Application Priority Data

Dec. 30, 1969    Germany..........P 19 65 600.9

[52] U.S. Cl. ...................285/24, 277/225, 285/235, 285/344, 285/383
[51] Int. Cl............................................F16l 21/02
[58] Field of Search........285/24, 230, 231, 235, 344, 285/351, 369, 417, 383; 277/DIG. 2, DIG. 3, 225

[56] References Cited

UNITED STATES PATENTS

| 2,926,028 | 2/1960 | Hookings et al. | 285/231 X |
| 3,572,777 | 3/1971 | Blose et al. | 285/351 X |
| 3,317,087 | 5/1967 | Landis | 285/235 X |
| 3,563,574 | 2/1971 | Jackson et al. | 285/235 X |

FOREIGN PATENTS OR APPLICATIONS

| 1,386,074 | 12/1964 | France | 285/369 |
| 29,073 | 12/1905 | Great Britain | 285/24 |
| 908,691 | 4/1954 | Germany | 285/344 |

Primary Examiner—David J. Williamowsky
Assistant Examiner—David H. Corbin
Attorney—Oberlin, Maky, Donnelly & Renner

[57] ABSTRACT

A device for interconnecting pipes and consisting of a yieldable plastics sleeve having two rows of axially offset lugs formed on its inner surface which serve to centralize and support the pipes. The rows of lugs have a gap therebetween accommodating a resilient or flexible plain annular disc. The disc separates the ends of the pipes and contacts stop faces of the lugs extending perpendicularly to the longitudinal axis of the sleeve.

These lugs also have inclined bearing faces adjoining the stop faces and engaging the pipes and the disc can slide over these faces when being installed in the gap. Sealing rings are disposed between the exterior of the pipes and the interior of the sleeve.

5 Claims, 2 Drawing Figures

Patented Oct. 24, 1972  3,700,266

3,700,266

DEVICES FOR CONNECTING PIPES TOGETHER

BACKGROUND TO THE INVENTION

The present invention relates to a device for connecting pipes together. The pipes may be made from stone, asbestos, synthetic plastics or similar materials, and may be used to convey liquids. The device is particularly intended for connecting such pipes in sewerage systems.

There is a need for a simple device which will connect pipes together and to some extent compensate for pipes of slightly non-circular cross-section.

An object of this invention is to provide such a device.

SUMMARY OF THE INVENTION

According to the present invention there is provided a device for connecting pipes together; said device being composed of a sleeve for receiving the pipes to be connected, the sleeve having lugs formed on its inner surface which serve to centralize and support the ends of the pipes, the lugs being arranged in rows axially offset from one another to form a gap therebetween for receiving an annular disc made of a flexible or resilient material, each lug having a stop face delimiting said gap and adjoining an inclined face engageable with one of the pipes and over which the disc can slide when being inserted into said gap.

In another aspect, the invention provides the combination of two pipes interconnected by means of a device composed of a sleeve into which the pipes extend, the sleeve having lugs formed on its inner surface which serve to centralize and support the pipes, the lugs being arranged in rows axially offset from one another to form a gap in which is disposed an annular disc made of a flexible or resilient material and located between the ends of the pipes, each lug having a stop face engaging or adjacent said disc and an inclined face engaging one of the pipes and over which the disc can slide when being inserted into said gap, and sealing rings disposed between the external surfaces of the pipes and the internal surface of the sleeve.

Preferably each row consists of at least four lugs, and the inclined face of each lug extends over about one third the total length of the lug.

According to a further feature of the invention the stop face of each lug is perpendicular to the longitudinal axis of the sleeve.

The disc can slide over the inclined faces of the lugs when being installed in the gap and due to its flexiblity or resilience the disc can adapt itself to the restriction in cross-section before becoming located in the gap by the stop faces.

The device is simple to produce and enables rapid assembly and disassembly of pipes.

Hitherto, due to stresses, small discontinuities can form on the floor of a pipe line at the joints between the individual pipes or in the pipes themselves which prevent optimum flow of liquids. In practice, attempts have hitherto been made to remedy this drawback by marking the places on the pipe line which are "out of true" and by appropriate positioning of the pipes in the pipe-line. The testing and the marking of the pipes, however, involve a considerable amount of labor.

In accordance with another feature of the invention the sleeve is made of a yieldable plastics material and all the lugs are arranged within one hemispherical section of the sleeve which forms the base of a pipe-line. By means of this feature an adequate evenness in the floor of the pipe-line can be achieved regardless of the type of pipe used and without the need for the above-mentioned testing and marking. The section of the sleeve containing the lugs is made the base of a pipe-line and the aforesaid feature prevents the formation of little discontinuities in the pipe line, such as are liable to appear, after the pipes have been laid, as a result of localized stresses. The sleeve can be marked to denote the base position at the actual production stage and if possible, the sleeve can be fitted onto a pipe end before it leaves the manufacturer's works.

The invention may be understood more readily and various other features of the invention may become more apparent from consideration of the following description.

BRIEF DESCRIPTION OF DRAWINGS

Embodiments of the invention will now be described, by way of examples only, with reference to the accompanying drawing, wherein.

DESCRIPTION OF PREFERRED EMBODIMENTS

Figure 1:
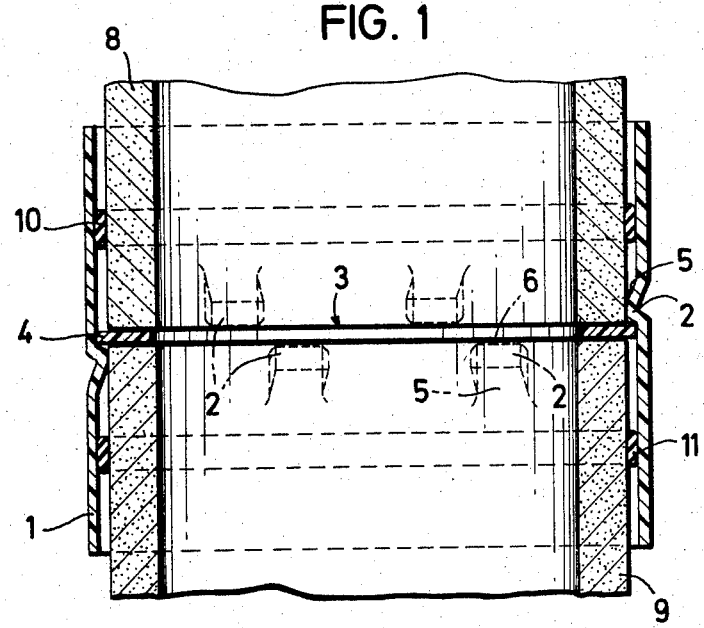
FIG. 1 is a longitudinal section through a device made in accordance with the invention.

As shown in FIG. 1, the device is in the form of a cylindrical sleeve 1 serving to inter-connect two pipes designated 8 and 9. The sleeve 1 is preferably made from a yieldable synthetic plastics material and has a plurality of lugs 2 formed on its inner surface at the longitudinal central region thereof. In this example the lugs 2 are produced by deforming the sleeve 1 to provide depressions on its outer surface.

The lugs 2 are arranged in two axially offset rows each row having at least four lugs. In this this way a gap 3 is formed between the rows of lugs, the gap 3 being disposed approximately at the center of the sleeve 1. Each of the lugs 2 is so formed that it has a substantially flat stop face 6 to delimit the gap 3 and the surface 6 adjoins an inclined bearing face 5 which in use engages one of the pipes 8, 9 extending perpendicularly of the longitudinal axis of the sleeve 1.

In FIG. 1, the lugs 2 of each row are aligned with one another to lie on a circle with one lug being situated 30° to each side of the lowest point of the sleeve 1 as viewed in FIG. 1, while at least two further lugs are distributed over the inside of the cylindrical sleeve 1 in such a way that no lugs are present in the top hemispherical part of the sleeve 1.

Figure 2:
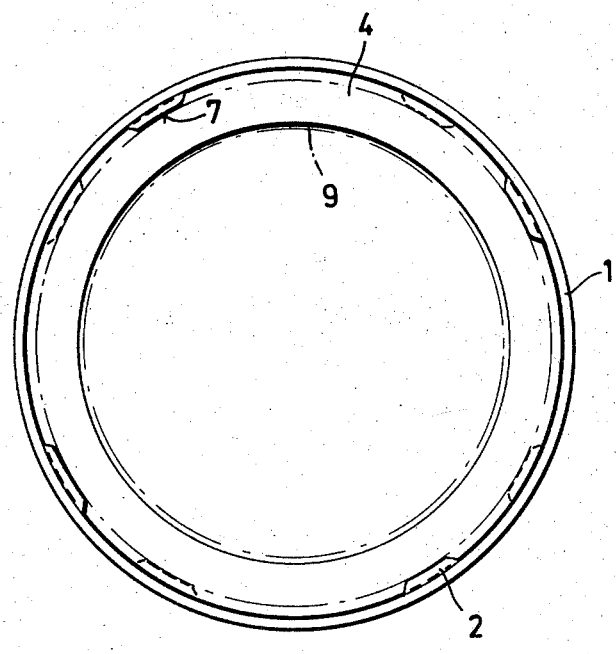
FIG. 2 is an end view of an alternative device made in accordance with the invention.

In the alternative construction depicted in FIG. 2 each row of lugs 2 consists of four lugs evenly distributed over the inner surface of the sleeve 1. The corresponding lugs of the two rows are offset in respect of one another by an angle of 60°. This arrangement ensures that the external surfaces of the pipes 8, 9 inserted in the sleeve 1 are evenly supported.

As with the embodiment shown in FIG. 1, each lug 2 has a stop face 6 adjoining an inclined bearing face, here designated 7 which extends over about one-third the total length of the lug 2. An annular disc 4 is disposed between the rows of lugs, i.e., in the gap 3 and the disc is made of elastic or flexible material to enable the disc 4 to be inserted into the sleeve 1 form either of the two ends of the latter and pushed over one of the rows of lugs 2, i.e., over the surfaces 5 thereof.

When the disc 4 is in place the pipes 8 and 9 are inserted from the two ends into the sleeve 1 and the pipes 8 and 9 are centered in the sleeve 1 by means of the lugs 2. The ends of the pipes 8, 9 can rest against the annular disc 4 or else be closely adjacent the disc 4 which thereby serves to prevent damage to the ends of the pipes 8, 9. The pipes 8, 9 are hermetically sealed by means of sealing rings 10 and 11 rolled into the sleeve. The rings 10, 11 have a normal circular cross-section but when rolled in they adopt the flat shape shown in FIG. 1.

I claim:

1. A device for connecting cylindrical pipes together, comprising:
   a. a substantially cylindrical sleeve of yieldable plastic material adapted to receive the ends of the pipes to be connected;
   b. lugs formed on the inner surface of said sleeve, said lugs being arranged in two axially offset circular rows to form a gap therebetween, said lugs in each of said rows being circumferentially spaced, each of said lugs being formed with a stop face delimiting said gap, an inclined face extending axially of the sleeve and a flat surface between said stop face and said inclined face;
   c. an annular disc made of yieldable material and located in said gap, the arrangement being such that said disc slides over the inclined faces of said lugs when said disc is inserted into said gap; and
   d. sealing rings disposed within the internal surface of said sleeve and adapted to engage the adjacent ends of inserted pipes.

2. The device of claim 1, wherein each row of lugs comprises at least four lugs.

3. The device of claim 1, wherein the inclined face of each lug extends over about one-third the total length of the lug.

4. The device of claim 1, wherein the stop face of each lug is perpendicular to the longitudinal axis of the sleeve.

5. The combination of two pipes and a sleeve of yieldable plastic material in which the ends of said pipes extend into said sleeve for retention thereby, said sleeve having lugs formed on its inner surface which engage the pipes to centralize and support the latter, said lugs being arranged in two circular rows axially offset to one another to form a gap therebetween, said lugs in each of said rows being circumferentially spaced, an annular disc made of yieldable material disposed within the gap and between the ends of the pipes, wherein each lug has a stop face adjacent the gap, an inclined face extending axially of the sleeve and a flat surface between said stop face and said inclined face engaging the adjacently disposed pipe, said disc sliding over the inclined faces of said lugs when inserted in the gap, and sealing rings disposed between the external surface of the ends of the two inserted pipes and the internal surface of the sleeve.

* * * * *